(12) United States Patent
Kurata et al.

(10) Patent No.: US 10,694,118 B2
(45) Date of Patent: Jun. 23, 2020

(54) SIGNAL PROCESSING APPARATUS, IMAGING APPARATUS, AND SIGNAL PROCESSING METHOD

(71) Applicant: SONY CORPORATION, Tokyo (JP)

(72) Inventors: Koji Kurata, Tokyo (JP); Naoki Okamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/074,026

(22) PCT Filed: Nov. 17, 2016

(86) PCT No.: PCT/JP2016/084058
§ 371 (c)(1),
(2) Date: Jul. 30, 2018

(87) PCT Pub. No.: WO2017/149854
PCT Pub. Date: Sep. 8, 2017

(65) Prior Publication Data
US 2019/0045139 A1 Feb. 7, 2019

(30) Foreign Application Priority Data

Feb. 29, 2016 (JP) .................................. 2016-036925

(51) Int. Cl.
*H04N 5/33* (2006.01)
*H04N 5/265* (2006.01)
(Continued)

(52) U.S. Cl.
CPC ........... *H04N 5/265* (2013.01); *G06K 9/2018* (2013.01); *H04N 5/232* (2013.01); *H04N 5/2351* (2013.01);
(Continued)

(58) Field of Classification Search
CPC ...... H04N 5/265; H04N 5/232; H04N 5/2351; H04N 5/243; H04N 5/33; H04N 9/04;
(Continued)

(56) References Cited

U.S. PATENT DOCUMENTS 7,570,286 B2 * 8/2009 Koike .................. G06T 5/50
348/235
7,589,771 B2 * 9/2009 Hosaka .................. H04N 5/217
348/252

(Continued)

FOREIGN PATENT DOCUMENTS

JP 2008-252639 A 10/2008
JP 2011-066809 A 3/2011
(Continued)

OTHER PUBLICATIONS

International Search Report and Written Opinion of PCT Application No. PCT/JP2016/084058, dated Feb. 7, 2017, 10 pages of English Translation and 09 pages of ISRWO.

(Continued)

*Primary Examiner* — Trang U Tran
(74) *Attorney, Agent, or Firm* — Chip Law Group

(57) ABSTRACT

In a signal processing apparatus including a mixing region detecting unit, and an image capturing condition updating unit, the mixing region detecting unit detects a region where a non-visible light image signal is to be mixed with a visible light image signal, the non-visible light image signal and the visible light image signal being generated by repeatedly performing imaging on a basis of a predetermined image capturing condition. The image capturing condition updating unit newly generates an image capturing condition in the non-visible light image signal on a basis of the non-visible light image signal in the detected region to update the predetermined image capturing condition. A region including fog, or the like is detected, a visible light image signal (Continued)

is mixed with a non-visible light image signal in the region, and image capturing conditions of the non-visible light image signal in the region are updated.

13 Claims, 14 Drawing Sheets

(51) Int. Cl.
| | |
|---|---|
| G06K 9/20 | (2006.01) |
| H04N 5/232 | (2006.01) |
| H04N 9/04 | (2006.01) |
| H04N 5/235 | (2006.01) |
| H04N 5/243 | (2006.01) |
| G06K 9/00 | (2006.01) |
| G06T 3/40 | (2006.01) |
| G06T 5/50 | (2006.01) |

(52) U.S. Cl.
CPC ............ *H04N 5/243* (2013.01); *H04N 5/33* (2013.01); *H04N 9/04* (2013.01); *H04N 9/045* (2013.01); *G06K 9/00228* (2013.01); *G06T 3/4015* (2013.01); *G06T 5/50* (2013.01); *G06T 2207/10024* (2013.01); *G06T 2207/10048* (2013.01); *G06T 2207/20221* (2013.01); *G06T 2207/30192* (2013.01); *H04N 5/332* (2013.01)

(58) Field of Classification Search
CPC ...... H04N 9/045; H04N 5/332; G06K 9/2018; G06K 9/00228; G06T 3/4015; G06T 5/50; G06T 2207/10024; G06T 2207/10048; G06T 2207/20221; G06T 2207/30192
USPC ......................................... 348/164, 159, 143
See application file for complete search history.

(56) References Cited

U.S. PATENT DOCUMENTS

| | | | | |
|---|---|---|---|---|
| 9,990,730 | B2* | 6/2018 | Bergstrom | H04N 5/332 |
| 10,152,811 | B2* | 12/2018 | Johnson | G06T 11/60 |
| 2008/0239091 | A1 | 10/2008 | Soga | |

FOREIGN PATENT DOCUMENTS

| | | |
|---|---|---|
| JP | 2013-255144 A | 12/2013 |
| JP | 2014-180024 A | 9/2014 |
| JP | 2017-011634 A | 1/2017 |
| WO | 2013/183330 A1 | 12/2013 |

OTHER PUBLICATIONS

International Preliminary Report on Patentability of PCT Application No. PCT/JP2016/084058, dated Sep. 13, 2018, 11 pages of English Translation and 06 pages of IPRP.

* cited by examiner

SIGNAL PROCESSING APPARATUS, IMAGING APPARATUS, AND SIGNAL PROCESSING METHOD

CROSS REFERENCE TO RELATED APPLICATIONS

This application is a U.S. National Phase of International Patent Application No. PCT/JP2016/084058 filed on Nov. 17, 2016, which claims priority benefit of Japanese Patent Application No. JP 2016-036925 filed in the Japan Patent Office on Feb. 29, 2016. Each of the above-referenced applications is hereby incorporated herein by reference in its entirety.

TECHNICAL FIELD

The present technology relates to a signal processing apparatus, an imaging apparatus, and a signal processing method. More particularly, the present technology relates to a signal processing apparatus which mixes a visible light image signal with a non-visible light image signal, an imaging apparatus and a signal processing method.

BACKGROUND ART

In related art, an imaging apparatus has been used which improves image quality by detecting whether or not it is foggy and increasing contrast of an image when imaging is performed. For example, a system which includes two cameras of a first camera and a second camera, and which captures an image including fog with the first camera and captures an image of a fog portion with the second camera has been proposed (for example, see Patent Literature 1). With this related art, a likelihood of dense fog is first detected from the image captured with the second camera. Then, correction processing such as increase of contrast and correction of luminance and color of the image captured with the first camera is performed on the basis of the detected likelihood of dense fog. By this means, image quality of the image including fog is improved.

CITATION LIST

Patent Literature

Patent Literature 1: JP 2014-180024A

DISCLOSURE OF INVENTION

Technical Problem

In the above-described related art, an image captured using only visible light is used. There is a problem that the visible light is likely to be scattered due to fog, or the like, and an image existing behind fog cannot be sufficiently captured. Therefore, there is a problem that, even if increase of contrast, or the like, is performed on the basis of a likelihood of dense fog after imaging, because it is impossible to reproduce the image existing behind fog, it is impossible to sufficiently improve image quality of an image including fog.

The present technology has been made in view of such circumstances, and is directed to improving image quality of an image including fog by mixing an infrared light image signal which is less likely to be affected by scattering due to fog with a visible light image signal to generate an image and optimizing image capturing conditions of the infrared light image signal.

Solution to Problem

The present technology has been devised to solve the above-described problem, and a first aspect thereof is a signal processing apparatus and a signal processing method, the signal processing apparatus including: a mixing region detecting unit configured to detect a region where a non-visible light image signal is to be mixed with a visible light image signal, the non-visible light image signal and the visible light image signal being generated by repeatedly performing imaging on a basis of a predetermined image capturing condition; and an image capturing condition updating unit configured to newly generate an image capturing condition in the non-visible light image signal on a basis of the non-visible light image signal in the detected region to update the predetermined image capturing condition. By this means, it is possible to provide effects that a region where a non-visible light image signal is to be mixed with a visible light image signal is detected, and image capturing conditions of the non-visible light image signal in this region are updated.

In addition, according to this first aspect, the image capturing condition updating unit may newly generate an image capturing condition in which the non-visible light image signal becomes substantially equal to the visible light image signal in the detected region to update the predetermined image capturing condition. By this means, it is possible to provide an effect that image capturing conditions in which the non-visible light image signal becomes substantially equal to the visible light image signal in the detected region are newly generated and updated.

In addition, according to this first aspect, the image capturing condition updating unit may newly generate an image capturing condition in which the non-visible light image signal in the detected region becomes substantially equal to the visible light image signal in a region other than the detected region to update the predetermined image capturing condition. By this means, it is possible to provide an effect that image capturing conditions in which the non-visible light image signal in the detected region becomes substantially equal to the visible light image signal in a region other than the detected region are newly generated and updated.

In addition, according to this first aspect, the mixing region detecting unit may detect the region on a basis of transmittance of fog imaged in the visible light image signal. By this means, it is possible to provide an effect that a region is detected on the basis of transmittance of fog imaged in the visible light image signal.

In addition, according to this first aspect, the mixing region detecting unit may detect, as the region, a region where the transmittance of the fog is less than a predetermined threshold. By this means, it is possible to provide an effect that a region where transmittance of fog is less than a predetermined threshold is detected as the region.

In addition, according to this first aspect, the mixing region detecting unit may detect, as the region, a region of a face included in the visible light image signal. This brings about an effect that a region of a face is detected as the region.

In addition, according to this first aspect, the mixing region detecting unit may detect, as the region, a region where the visible light image signal is greater than a predetermined threshold. This brings about an effect that a region where the visible light image signal is greater than a predetermined threshold is detected as the region.

In addition, according to this first aspect, the mixing region detecting unit may detect, as the region, a region where the visible light image signal is less than a predetermined threshold. This brings about an effect that a region where the visible light image signal is less than a predetermined threshold is detected as the region.

In addition, according to this first aspect, a mixing ratio generating unit configured to generate a mixing ratio in the mixing on a basis of the non-visible light image signal in the detected region may be further included. The image capturing condition updating unit may newly generate an image capturing condition in the non-visible light image signal on a basis of the generated mixing ratio to update the predetermined image capturing condition. This brings about effects that a generation mixing ratio is generated on the basis of the non-visible light image signal in the detected region, and image capturing conditions in the non-visible light image signal are newly generated and updated on the basis of this mixing ratio.

In addition, according to this first aspect, an amplifying unit configured to adjust a level of the non-visible light image signal on a basis of the image capturing condition may be further included. This brings about an effect that a level of the non-visible light image signal is adjusted on the basis of the image capturing conditions.

In addition, according to this first aspect, the non-visible light image signal may be an infrared light image signal corresponding to infrared light. This brings about effects that a region where an infrared light image signal is to be mixed with a visible light image signal is detected, and image capturing conditions of the infrared light image signal in this region are updated.

In addition, a second aspect of the present technology is an imaging apparatus including: an image sensor configured to generate a non-visible light image signal and a visible light image signal by repeatedly performing imaging on a basis of a predetermined image capturing condition; a mixing region detecting unit configured to detect a region where the non-visible light image signal is to be mixed with the visible light image signal; and an image capturing condition updating unit configured to newly generate an image capturing condition in the non-visible light image signal on a basis of the non-visible light image signal in the detected region to update the predetermined image capturing condition. This brings about effects that a region where a non-visible light image signal is to be mixed with a visible light image signal is detected, and image capturing conditions of the non-visible light image signal in this region are updated.

Advantageous Effects of Invention

According to the present technology, it is possible to provide an excellent effect of improving image quality of an image including fog by mixing an infrared light image signal which is less likely to be affect by scattering due to fog with a visible light image signal to generate an image and optimizing image capturing conditions of the infrared light image signal. Note that effects described herein are not necessarily limitative, and any effect that is desired to be described in the present disclosure may be admitted.

MODE(S) FOR CARRYING OUT THE INVENTION

Modes for carrying out the present technology (hereinafter, referred to as embodiments) will be described below. Description will be provided in the following order.
1. First embodiment (example in the case where region where visible light image signal is to be mixed with infrared light image signal is detected on the basis of transmittance of fog)
2. Second embodiment (example in the case where face region is detected and visible light image signal is mixed with infrared light image signal)
3. Third embodiment (example in the case where dark portion of image is detected and visible light image signal is mixed with infrared light image signal)
4. Fourth embodiment (example in the case where saturation region of image is detected and visible light image signal is mixed with infrared light image signal)
5. Fifth embodiment (example in the case where two image sensors are provided)
6. Sixth embodiment (example in the case where infrared light image signal amplifying unit is provided)
7. Modified example

1. First Embodiment

[Configuration of Imaging Apparatus]

Figure 1:
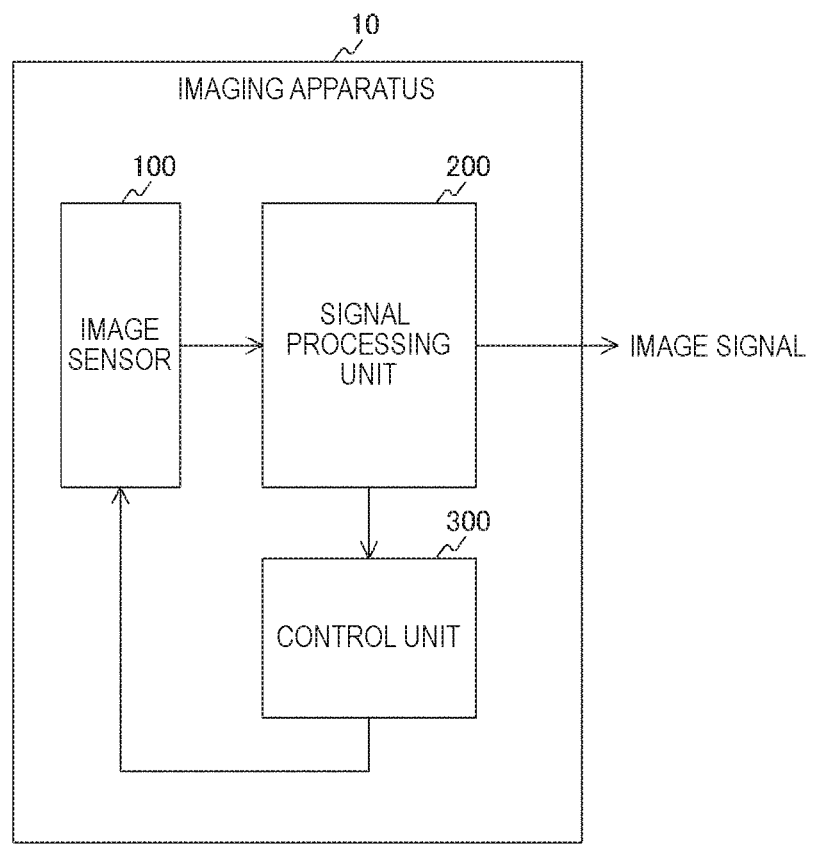
FIG. 1 is a diagram illustrating a configuration example of an imaging apparatus 10 in a first embodiment of the present technology.

FIG. 1 is a diagram illustrating a configuration example of an imaging apparatus 10 in a first embodiment of the present technology. The imaging apparatus 10 includes an image sensor 100, a signal processing unit 200 and a control unit 300.

The image sensor 100 generates a visible light image signal and an infrared light image signal by imaging a subject. The image sensor 100 is configured by two-dimensionally arranging pixels which generate an image signal on a surface which receives external light. As the pixels, a pixel (R pixel) which generates an image signal corresponding to red light (R signal), a pixel (G pixel) which generates an image signal corresponding to green light (G signal), and a pixel (B pixel) which generates an image signal corresponding to blue light (B signal) are arranged on a light receiving surface. Further, a pixel (IR pixel) which generates an image signal corresponding to infrared light (IR signal) is further arranged. These pixels are arranged on a light receiving surface of the image sensor 100 on the basis of a predetermined pattern. For example, the pixels are repeatedly arranged on the light receiving surface in accordance with an array in which one of two G pixels in a Bayer array is replaced with an IR pixel.

A visible light image signal is generated from an R pixel, a G pixel and a B pixel. That is, the visible light image signal is configured with an R signal, a G signal and a B signal. Meanwhile, an infrared light image signal configured with an IR signal is generated from an IR pixel. The visible light image signal and the infrared light image signal are alternately generated, so that a visible light image and an infrared light image for the same subject are generated. The visible light image signal is mixed with the infrared light image signal at a signal processing unit 200 which will be described later, and thereby an image of one frame is generated. Here, the frame is an image signal corresponding to one screen. As a result of imaging by the image sensor 100 being successively performed, frames are successively generated, so that a moving image is formed. Further, in the case where a still image is acquired, imaging by the image sensor 100 is successively performed when continuous shooting is performed. The signal processing unit 200 which will be described later updates image capturing conditions when imaging is successively performed, so as to optimize the image capturing conditions.

Further, the image sensor 100 performs imaging on the basis of image capturing conditions. Here, the image capturing conditions are conditions upon imaging, and, for example, correspond to exposure time and gain for adjusting a signal level of an image signal. The image capturing conditions are generated by the signal processing unit 200 and set for the image sensor 100 by the control unit 300.

The signal processing unit 200 performs processing on the image signals generated by the image sensor 100. As the processing on the image signals, for example, it is possible to perform processing of mixing a visible light image signal with an infrared light image signal, the visible light image signal and the infrared light image signal being generated by the image sensor 100. The image signals subjected to processing by the signal processing unit 200 are output to outside of the imaging apparatus 10 as output image signals of the imaging apparatus 10. Further, the signal processing unit 200 generates image capturing conditions on the basis of the visible light image signal and the infrared light image signal and outputs the image capturing conditions to the control unit 300. The image capturing conditions are generated for each of the visible light image signal and the infrared light image signal.

The control unit 300 controls generation of the visible light image signal and the infrared light image signal at the image sensor 100. In this control, the image sensor 100 is controlled by image capturing conditions for the visible light image signal and the infrared light image signal generated by the signal processing unit 200 being alternately set for the image sensor 100. Further, the control unit 300 further controls the whole imaging apparatus 10.

[Configuration of Signal Processing Unit]

Figure 2:
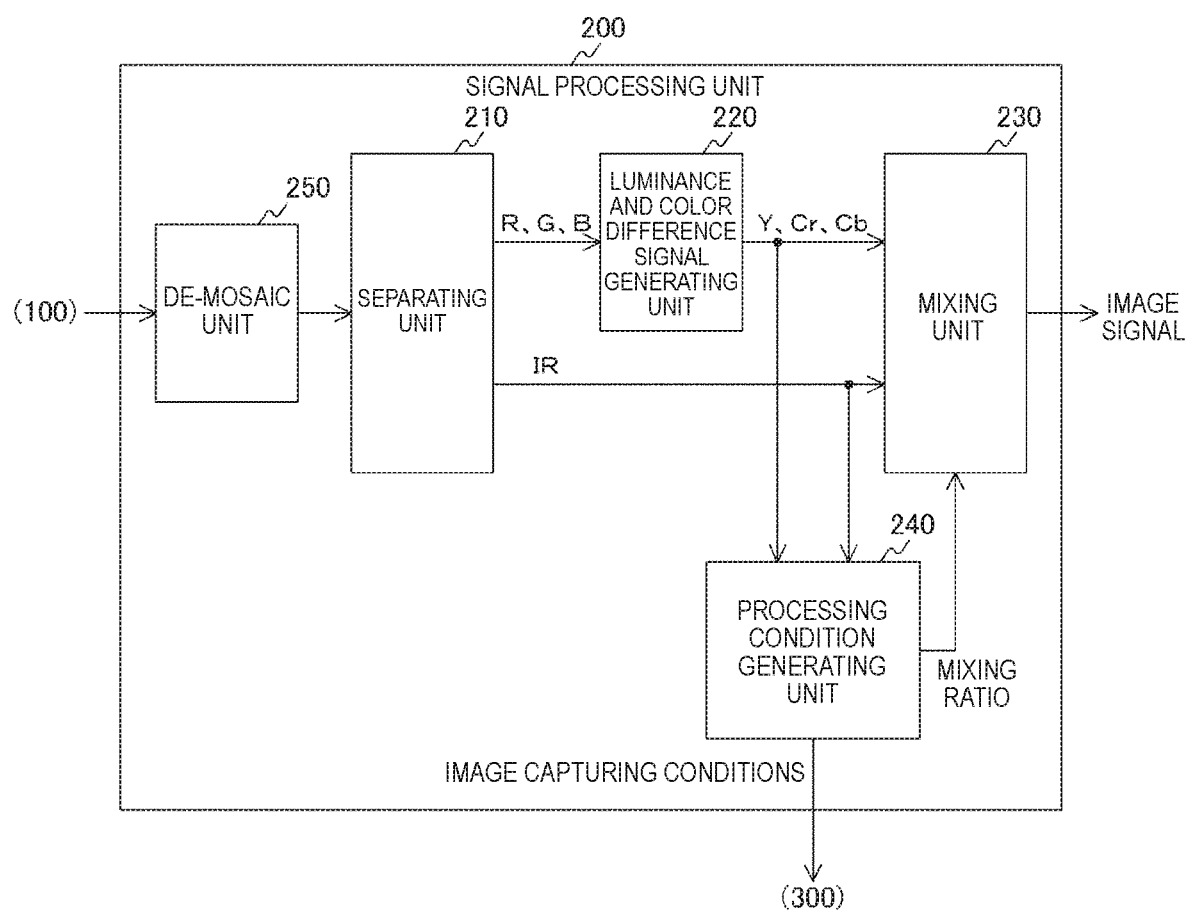
FIG. 2 is a diagram illustrating a configuration example of a signal processing unit 200 in the first embodiment of the present technology.

FIG. 2 is a diagram illustrating a configuration example of the signal processing unit 200 in the first embodiment of the present technology. The signal processing unit 200 includes a de-mosaic unit 250, a separating unit 210, a luminance and color difference signal generating unit 220, a mixing unit 230 and a processing condition generating unit 240.

The de-mosaic unit 250 performs de-mosaic processing on the image signals generated by the image sensor 100 and outputs the image signals to the separating unit 210. Here, the de-mosaic processing is processing of complementing a deficient image signal with respect to the image signals which are monochrome and which are generated by the image sensor 100. Through this de-mosaic processing, an image signal per one pixel increases to four signals of an R signal, a G signal, a B signal and an IR signal.

The separating unit 210 separates the visible light image signal and the infrared light image signal generated by the image sensor 100. The separated visible light image signal is output to the luminance and color difference signal generating unit 220. Meanwhile, the separated infrared light image signal is output to the mixing unit 230.

The luminance and color difference signal generating unit 220 converts the R signal, the G signal and the B signal which are visible light image signals output from the separating unit 210 into a luminance signal (Y signal) and color difference signals (a Cr signal and a Cb signal). The Cr signal is a signal based on a difference between the R signal and the Y signal, and the Cb signal is a signal based on a difference between the B signal and the Y signal. A publicly known conversion equation can be used in this conversion. The Y signal, the Cb signal and the Cr signal after conversion are output to the mixing unit 230.

The mixing unit 230 mixes the visible light image signal with the infrared light image signal to generate an image signal of one frame. The mixing unit 230 divides a frame into a plurality of regions and performs mixing for each of the regions divided from the frame. In this event, mixing is performed on the basis of a mixing ratio for each region generated by the processing condition generating unit 240 which will be described later. In this division of the frame, for example, it is possible to employ a scheme of dividing a frame into 63 regions of 7 in a longitudinal direction×9 in a horizontal direction. The mixing unit 230 in FIG. 2 mixes the Y signal output from the luminance and color difference signal generating unit 220 with the IR signal output from the separating unit 210. Mixing can be performed, for example, on the basis of the following equation.

$$Y'=IR \times \alpha + Y \times (1-\alpha)$$

Here, Y' indicates the Y signal after mixing. Further, α indicates a mixing ratio. The Y' signal after mixing and the Cr signal and the Cb signal become output image signals of the imaging apparatus 10. Details of mixing at the mixing unit 230 will be described later.

The processing condition generating unit 240 generates processing conditions on the basis of the visible light image signal and the infrared light image signal. The processing condition generating unit 240 generates processing conditions on the basis of the Y signal output from the luminance and color difference signal generating unit 220 and the IR signal output from the separating unit 210. The above-mentioned image capturing conditions and the mixing ratio α are generated as the processing conditions. Details of the configuration of the processing condition generating unit 240 will be described later.

[Configuration of Processing Condition Generating Unit]

Figure 3:
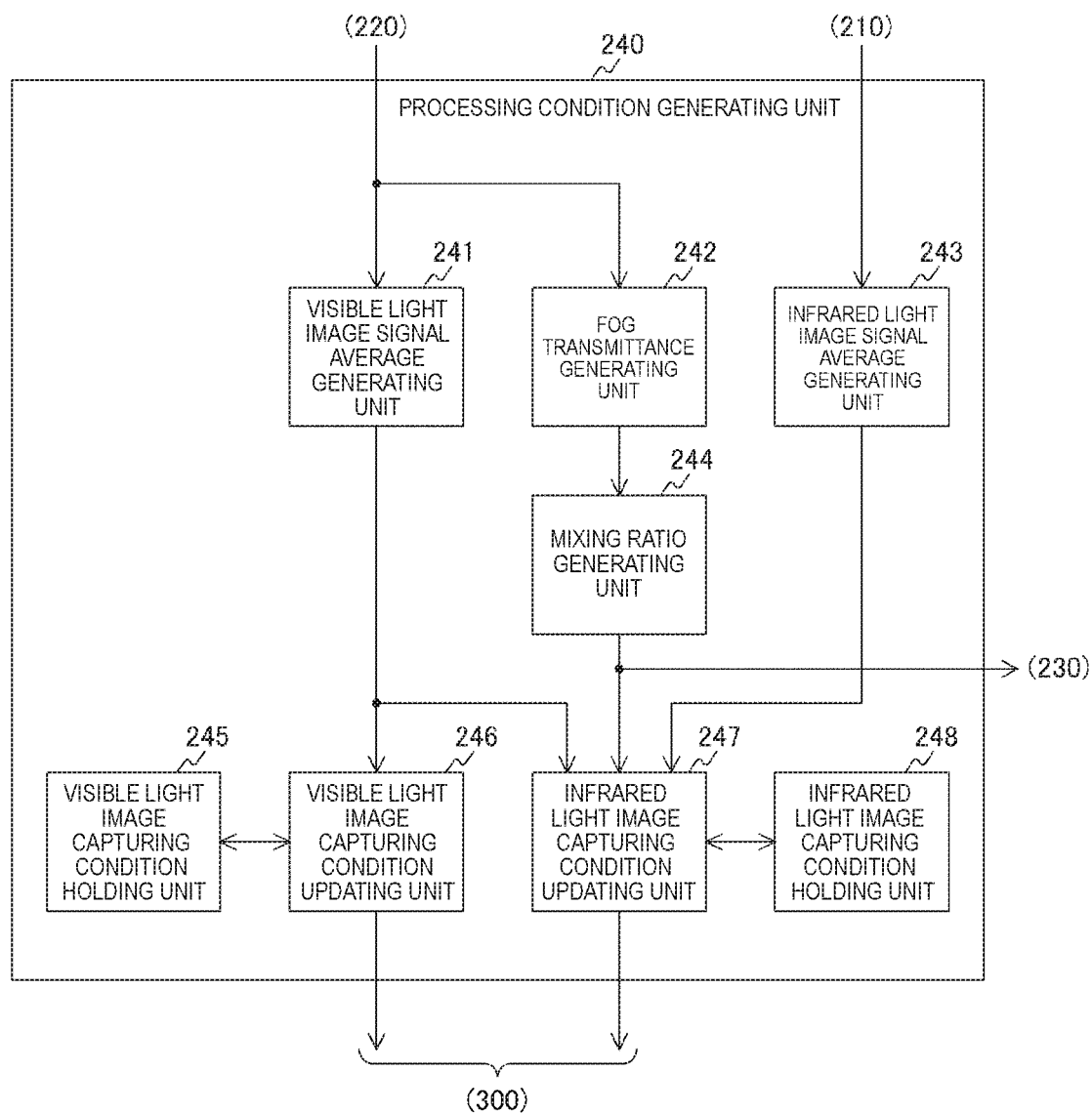
FIG. 3 is a diagram illustrating a configuration example of a processing condition generating unit 240 in the first embodiment of the present technology.

FIG. 3 is a diagram illustrating a configuration example of the processing condition generating unit 240 in the first embodiment of the present technology. The processing condition generating unit 240 includes a visible light image signal average generating unit 241, a fog transmittance generating unit 242, an infrared light image signal average generating unit 243, a mixing ratio generating unit 244, a visible light image capturing condition holding unit 245 and a visible light image capturing condition updating unit 246. Further, the processing condition generating unit 240 further includes an infrared light image capturing condition updating unit 247 and an infrared light image capturing condition holding unit 248.

The visible light image signal average generating unit 241 divides a visible light image signal corresponding to one screen into a plurality of regions and generates an average of visible light image signals (Y signals) in the divided regions for each region. In this division into the regions, it is possible to employ a division scheme at the mixing unit 230 described in FIG. 2.

The visible light image capturing condition holding unit 245 holds visible light image capturing conditions which are image capturing conditions of the visible light image signal. In the visible light image capturing condition holding unit 245, predetermined image capturing conditions are held as initial conditions.

The visible light image capturing condition updating unit 246 updates image capturing conditions of the visible light image held in the visible light image capturing condition holding unit 245. The visible light image capturing condition updating unit 246 generates new image capturing conditions on the basis of the average of the Y signals generated by the visible light image signal average generating unit 241 and outputs the new image capturing conditions to the control unit 300. In this event, infrared light image capturing conditions in which brightness of the infrared light image signal becomes substantially equal to brightness of the visible light image signal in the region detected by the fog transmittance generating unit 242 are generated. Further, the visible light image capturing condition updating unit 246 performs updating by causing the visible light image capturing condition holding unit 245 to hold the generated new image capturing conditions. Details of processing of this updating will be described later.

The fog transmittance generating unit 242 generates fog transmittance on the basis of the visible light image signal. The fog transmittance generating unit 242 generates transmittance of fog for each region divided by the above-mentioned mixing unit 230 and outputs the transmittance to the mixing ratio generating unit 244. In detection of transmittance of fog, a publicly known method can be used. For example, it is possible to use a method in which density of fog is estimated for each region of the image signal, and the estimated density of fog is converted into transmittance using a soft-matching method, or the like.

Because visible light is scattered in a region where fog, or the like, is imaged among the images generated by the image sensor 100, visibility is lowered. Therefore, in such a region, the infrared light image signal is mixed with the visible light image signal. Because infrared light is less likely to be affected by scattering due to fog, or the like, it is possible to improve visibility by the mixing. The fog transmittance generating unit 242 detects a region where mixing is to be performed on the basis of the transmittance of fog. At the fog transmittance generating unit 242 in FIG. 3, fog transmittance is generated for each region, and output to the mixing ratio generating unit 244. As will be described later, the mixing ratio generating unit 244 generates a mixing ratio in which a ratio of the infrared light image signal to be mixed is set high for a region where transmittance of fog is low. In this manner, a region where mixing is to be performed is detected by the fog transmittance generating unit 242. Note that it is also possible to employ a scheme in which a region where transmittance of fog is lower than a predetermined threshold is detected and output to the mixing ratio generating unit 244. Note that the fog transmittance generating unit 242 is an example of a mixing region detecting unit recited in the claims.

The mixing ratio detecting unit 244 generates a mixing ratio α on the basis of the infrared light image signal in the region detected by the fog transmittance generating unit 242. Details of generation of the mixing ratio α will be described later.

The infrared light image signal average generating unit 243 divides the infrared light image signal corresponding to one screen into a plurality of regions and generates an average of the infrared light image signals (IR signals) in the divided regions for each region. In this division into the regions, it is possible to employ a division scheme at the mixing unit 230 in a similar manner to the visible light image signal average generating unit 241.

The infrared light image capturing condition holding unit 248 holds infrared light image capturing conditions which are image capturing conditions of the infrared light image signal. In the infrared light image capturing condition holding unit 248, predetermined image capturing conditions are held as initial conditions.

The infrared light image capturing condition updating unit 247 updates image capturing conditions of the infrared light held at the infrared light image capturing condition holding unit 248. To the infrared light image capturing condition updating unit 247, the average of the Y signals generated by the visible light image signal average generating unit 241, the average of the IR signals generated by the infrared light image signal average generating unit 243, and the mixing ratio α generated by the mixing ratio generating unit 244 are input. The infrared light image capturing condition updating unit 247 generates new image capturing conditions on the basis of these signals and outputs the new image capturing conditions to the control unit 300. Further, the infrared light image capturing condition updating unit 247 performs updating by causing the infrared light image capturing condition holding unit 248 to hold the generated new image capturing conditions. Details of processing of this updating will be described later.

[Generation of Mixing Ratio]

Figure 4:
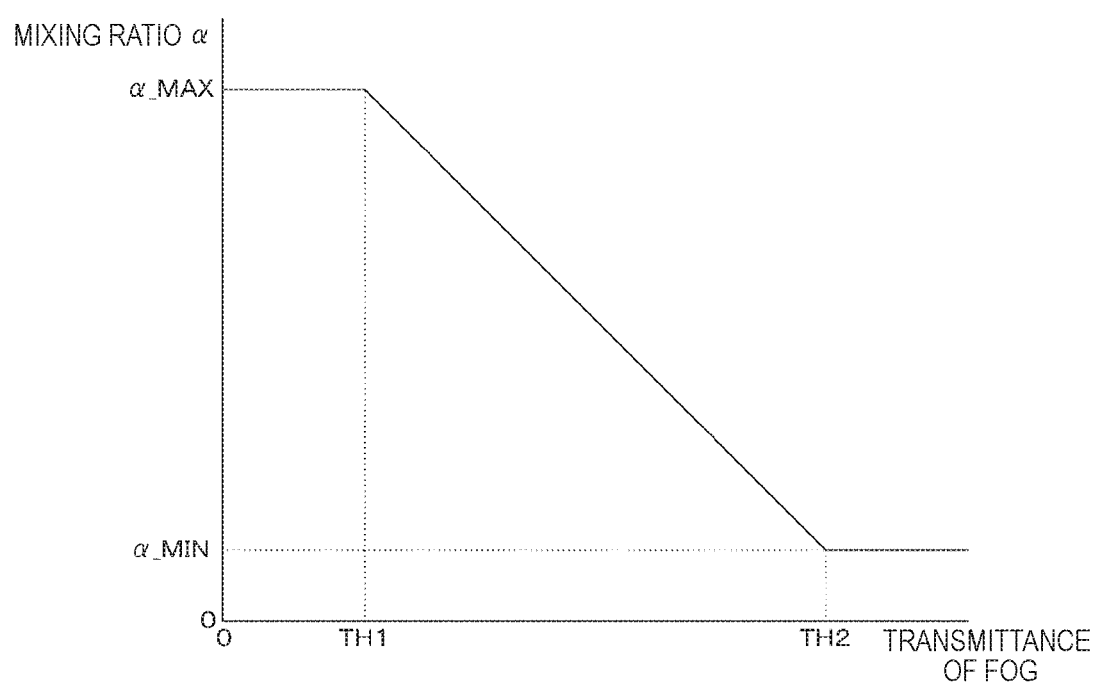
FIG. 4 is a diagram illustrating an example of generation of a mixing ratio in the first embodiment of the present technology.

FIG. 4 is a diagram illustrating an example of generation of the mixing ratio in the first embodiment of the present technology. FIG. 4 illustrates generation of the mixing ratio α at the mixing ratio generating unit 244. As illustrated in FIG. 4, the mixing ratio generating unit 244 converts the transmittance output from the fog transmittance generating unit 242 into a mixing ratio α. In FIG. 4, α_MAX and α_MIN respectively correspond to a maximum value and a minimum value of the mixing ratio α. For example, as α_MAX and α_MIN, values of "1" and "0" can be respectively employed. In the case where a value of the transmittance is between 0 and a threshold TH1, α_MAX is output as the mixing ratio α. In the case where the value of the transmittance is between the thresholds TH1 and TH2, the mixing ratio α is made to linearly change from α_MAX to α_MIN. In the case where the value of the transmittance exceeds the threshold TH2, α_MIN is output as the mixing ratio α.

Note that generation of the mixing ratio α is not limited to this example, and, for example, it is also possible to employ a scheme in which one of α_MAX and α_MIN is output on the basis of the threshold TH1.

[Visible Light Image Capturing Condition Updating Processing]

Figure 5:
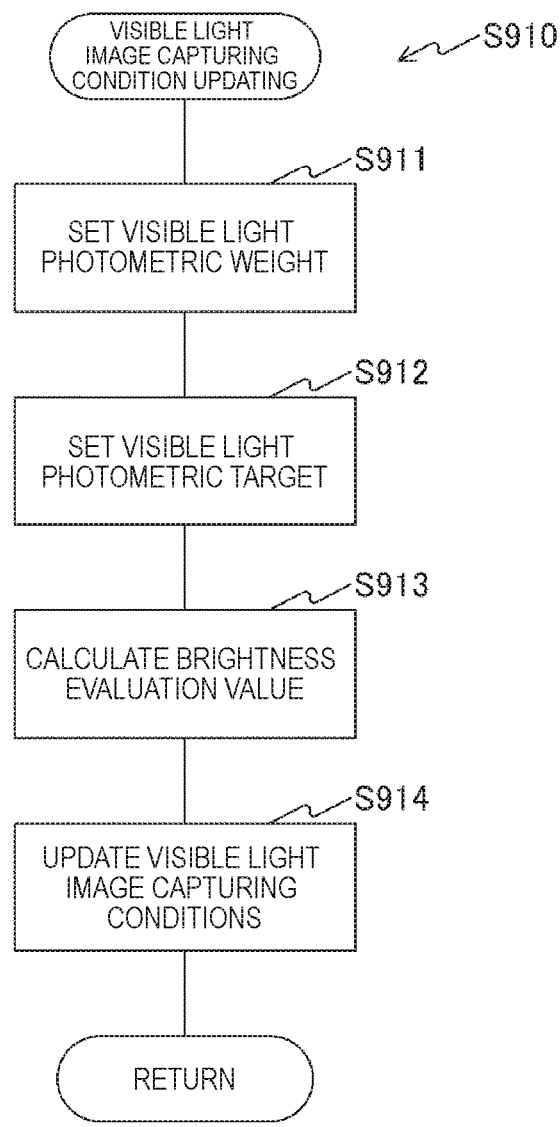
FIG. 5 is a diagram illustrating an example of processing procedure of visible light image capturing condition updating processing in the first embodiment of the present technology.

FIG. 5 is a diagram illustrating an example of processing procedure of visible light image capturing condition updating processing in the first embodiment of the present technology. FIG. 5 illustrates updating processing of visible light image capturing conditions at the visible light image capturing condition updating unit 246.

First, a visible light photometric weight is set (step S911). Here, the visible light photometric weight is a weight set for each region. This visible light photometric weight is used upon calculation of a brightness evaluation value which will be described later. A greater weight is generated for a region where brightness is preferentially adjusted, for example, a center region of a screen. Subsequently, the region is weighted upon calculation of the brightness evaluation value.

Then, a visible light photometric target is set (step S912). Here, the visible light photometric target is a target value of brightness of the visible light image.

Then, a brightness evaluation value is calculated (step S913). This can be performed as follows. First, an average of weights set in step S911 is calculated for the average of the visible light image signals for each region output from the visible light image signal average generating unit 241. A difference between the calculated average and the visible light photometric target generated in step S912 is set as the brightness evaluation value.

Then, the visible light image capturing conditions are updated (step S914). This can be performed as follows. First, new visible light image capturing conditions are generated by adjusting the visible light image capturing conditions held at the visible light image capturing condition holding unit 245 on the basis of the brightness evaluation value generated in step S913. Then, the new visible light image capturing conditions are held at the visible light image capturing condition holding unit 245.

Subsequently, the visible light image capturing condition updating processing is finished. Note that the newly generated visible light image capturing conditions are output to the control unit 300 as image capturing conditions for the next frame.

[Infrared Light Image Capturing Condition Updating Processing]

Figure 6:
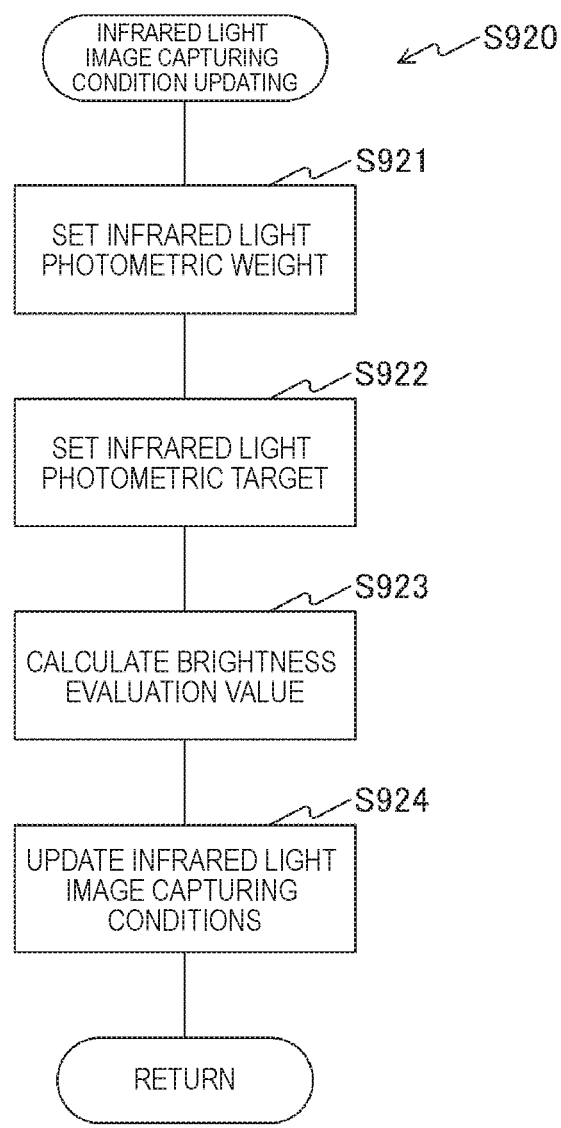
FIG. 6 is a diagram illustrating an example of processing procedure of infrared light image capturing condition updating processing in the first embodiment of the present technology.

FIG. 6 is a diagram illustrating an example of processing procedure of infrared light image capturing condition updating processing in the first embodiment of the present technology. FIG. 6 illustrates updating processing of infrared light image capturing conditions at the infrared light image capturing condition updating unit 247.

First, an infrared light photometric weight is set (step S921). Here, the infrared light photometric weight is a weight set for each region. In a similar manner to the above-described visible light photometric weight, a greater weight is generated for a region where brightness is preferentially adjusted. This infrared light photometric weight is generated on the basis of the mixing ratio for each region generated by the mixing ratio generating unit 244. Details of generation of this infrared light photometric weight will be described later.

Then, an infrared light photometric target is set (step S922). Here, the infrared light photometric target is a target value of brightness of the infrared light image. The infrared light photometric target can be set by calculating an average of the infrared light photometric weights set in step S921 for the average of the visible light image signals for each region output from the visible light image signal average generating unit 241. By this means, it is possible to set brightness of the infrared light and brightness of the visible light at values close to each other in a region where a high mixing ratio is set.

Then, a brightness evaluation value is calculated (step S923). This can be performed as follows. First, an average of the infrared light photometric weights set in step S921 is calculated for the average of the infrared light image signals for each region output from the infrared light image signal average generating unit 243. A difference between the calculated average and the infrared light photometric target generated in step S922 is set as the brightness evaluation value.

Then, infrared light image capturing conditions are updated (step S924). This can be performed as follows. First, new infrared light image capturing conditions are generated by adjusting the infrared light image capturing conditions held at the infrared light image capturing condition holding unit 248 on the basis of the brightness evaluation value generated in step S923. Then, the new infrared light image capturing conditions are held at the infrared light image capturing condition holding unit 248.

Subsequently, the infrared light image capturing condition updating processing is finished. Note that the newly generated infrared light image capturing conditions are output to the control unit 300 as image capturing conditions for the next frame.

[Generation of Infrared Light Photometric Weight]

Figure 7:
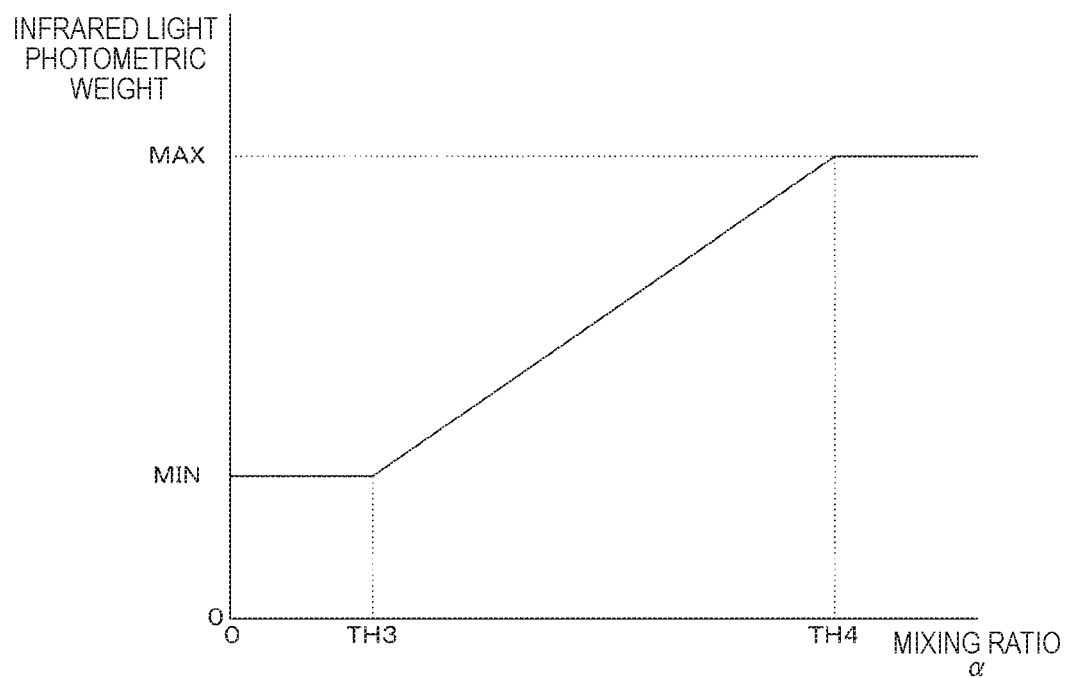
FIG. 7 is a diagram illustrating an example of generation of an infrared light photometric weight in the first embodiment of the present technology.

FIG. 7 is a diagram illustrating an example of generation of the infrared light photometric weight in the first embodiment of the present technology. FIG. 7 illustrates generation of the infrared light photometric weight at the infrared light image capturing condition updating unit 247, which is processing performed in step S921 described in FIG. 6. As illustrated in FIG. 7, the infrared light image capturing condition updating unit 247 converts the mixing ratio α output from the mixing ratio generating unit 244 into an infrared light photometric weight. In FIG. 7, MAX and MIN respectively correspond to a maximum value and a minimum value of the infrared light photometric weight. In the case where a value of the mixing ratio α is between 0 and a threshold TH3, MIN is output as the infrared light photometric weight. In the case where the mixing ratio α is between the threshold TH3 and a threshold TH4, the infrared light photometric weight is made to linearly change from MIN to MAX. In the case where the value of the mixing ratio α exceeds the threshold TH4, MAX is output as the infrared light photometric weight.

In this manner, transmittance of fog is generated by the fog transmittance generating unit 242, and a higher mixing ratio α is generated by the mixing ratio generating unit 244 for a region where the transmittance of fog is lower. By this means, more infrared light image signals are mixed in a region where transmittance of fog is lower, so that it is possible to improve visibility. Further, an infrared light photometric target is generated while a greater infrared light photometric weight is set for a region where the mixing ratio α is higher by the infrared light image capturing condition updating unit 247. By this means, infrared light image capturing conditions which make brightness of infrared light and brightness of visible light values close to each other in a region where transmittance of fog is low are generated. It is possible to make a signal level of the infrared light image signal in a region where transmittance of fog is low substantially the same as a signal level of the visible light image signal in the region by imaging the next frame on the basis of the generated infrared light image capturing conditions. By this means, luminance of the region where signals are mixed becomes substantially equal to luminance of other regions, so that it is possible to improve image quality.

[Setting of Processing Conditions]

Figure 8:
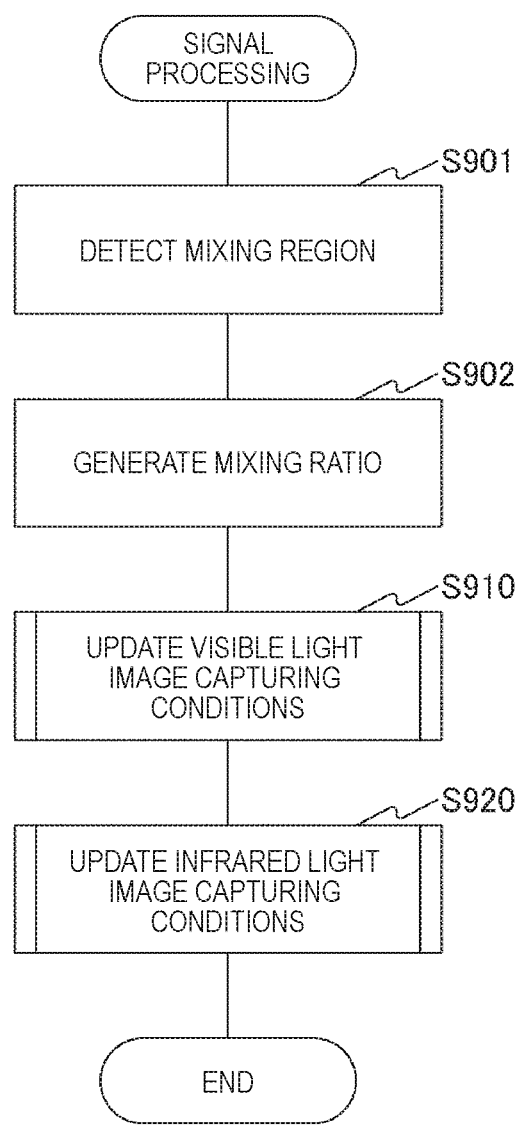
FIG. 8 is a diagram illustrating an example of processing procedure of signal processing in the first embodiment of the present technology.

FIG. 8 is a diagram illustrating an example of processing procedure of signal processing in the first embodiment of the present technology. FIG. 8 illustrates signal processing at the processing condition generating unit 240. The processing in FIG. 8 is executed in the case where the visible light image signal and the infrared light image signal are generated by the image sensor 100, and input to the processing condition generating unit 240. First, a region where signals are to be mixed is detected (step S901). This is performed by the fog transmittance generating unit 242 generating transmittance of fog. Then, a mixing ratio is generated by the mixing ratio generating unit 244 (step S902). Then, the visible light image capturing condition updating described in FIG. 5 is performed (step S910). Finally, the infrared light image capturing condition updating described in FIG. 6 is performed (step S920), and the processing condition generating unit 240 finishes signal processing.

In this manner, in the first embodiment of the present technology, an image in which a visible light image signal is mixed with an infrared light image signal is generated in a region where transmittance of fog is low. In this event, image capturing conditions of the infrared light image signal which make brightness of the infrared light image signal substantially equal to brightness of the visible light image signal in the region are newly generated, and image capturing conditions are updated. In the case where imaging is successively performed, next imaging is performed on the basis of the updated image capturing conditions. By this means, it is possible to make brightness of these image signals substantially equal to each other in a region where transmittance of fog is low, so that it is possible to improve image quality of an image including fog.

2. Second Embodiment

In the above-described first embodiment, a region where an infrared light image signal is to be mixed with a visible light image signal is detected by calculating transmittance of fog. In contrast to this, in a second embodiment of the present technology, a face region of a person is detected. By this means, it is possible to improve image quality in a face region.

[Configuration of Processing Condition Generating Unit]

Figure 9:
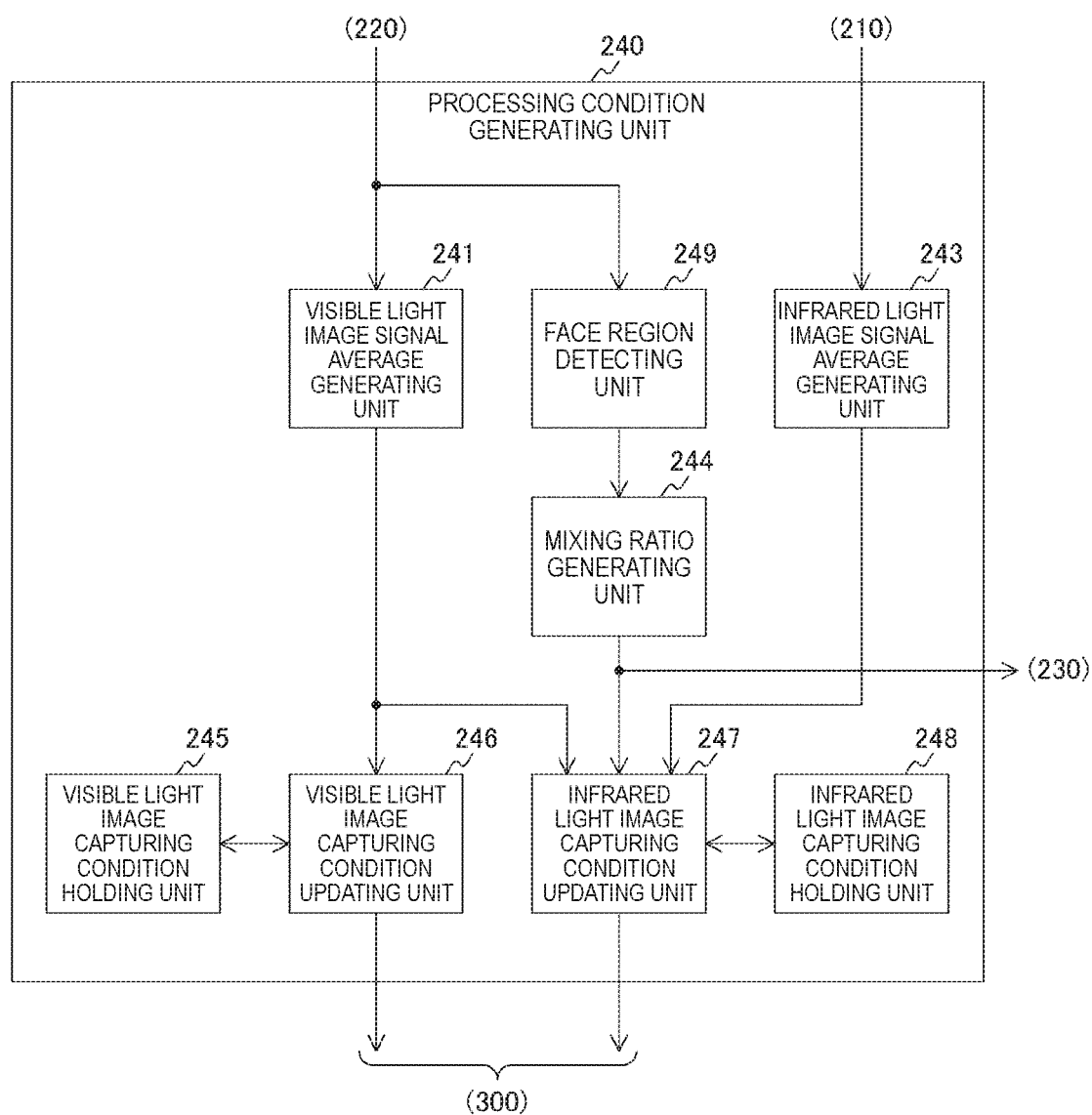
FIG. 9 is a diagram illustrating a configuration example of a processing condition generating unit 240 in a second embodiment of the present technology.

FIG. 9 is a diagram illustrating a configuration example of the processing condition generating unit 240 in the second embodiment of the present technology. The processing condition generating unit 240 in FIG. 9 is different from the processing condition generating unit 240 described in FIG. 3 in that a face region detecting unit 249 is provided in place of the fog transmittance generating unit 242.

The face region detecting unit 249 detects a face region on the basis of the visible light image signal. In this detection of the face region, a publicly known method can be used. The face region detecting unit 249 can, for example, output a region including a face to the mixing ratio generating unit 244 as a detection result. Further, the face region detecting unit 249 can, for example, output a probability that a region is a face region for each of the regions divided from an image as a detection result. Note that the face region detecting unit 249 is an example of a mixing region detecting unit recited in the claims.

The mixing ratio generating unit 244 in FIG. 9 generates a mixing ratio on the basis of output from the face region detecting unit 249. For example, in the case where a region including a face is output from the face region detecting unit 249 as a detection result, it is possible to generate a high mixing ratio for the region. Further, in the case where a probability of a face is output from the face region detecting unit 249 for each region, it is, for example, possible to generate a mixing ratio proportional to this probability. Because characteristics of penetration to skin of a person are different between infrared light and visible light, an image captured using infrared light becomes an image with less freckles of skin, or the like. Therefore, by mixing the infrared light image signal in the face region, it is possible to generate an image of a face with less freckles, or the like. In this event, image capturing conditions which make brightness of the infrared light image signal substantially equal to brightness of the visible light image signal in the face region are generated by the infrared light image capturing condition updating unit 247, and applied to imaging of the next frame.

Because other components of the imaging apparatus 10 are similar to the components of the imaging apparatus 10 described in the first embodiment, description will be omitted.

In this manner, in the second embodiment of the present technology, an image in which an infrared light image signal is mixed with a visible light image signal in a detected face region is generated. In this event, image capturing conditions of the infrared light image signal which make brightness of the infrared light image signal substantially equal to brightness of the visible light image signal in the region are newly generated, and the image capturing conditions are updated. The next imaging is performed on the basis of the updated image capturing conditions. Therefore, it is possible to make brightness of the infrared light image signal substantially equal to brightness of the visible light image signal in a face region, so that it is possible to improve image quality.

Modified Example

While, in the above-described second embodiment, a face region is detected, it is also possible to detect a region designated by a user and generate a mixed image signal in the region. For example, it is possible to employ a scheme in which a region designated by the user is detected in place of a face region at the face region detecting unit 249 and output to the mixing ratio generating unit 244. In this case, a region recognized as a face region by the user becomes a face region detected by the face region detecting unit 249. By this means, it is possible to improve image quality of a region designated by the user.

Because other components of the imaging apparatus 10 are similar to the components of the imaging apparatus 10 described in the second embodiment of the present technology, description will be omitted.

In this manner, according to the modified example of the second embodiment of the present technology, it is possible to improve image quality of a region designated by the user.

3. Third Embodiment

In the above-described first embodiment, a region where an infrared light image signal is to be mixed with a visible light image signal is detected by calculating transmittance of fog. In contrast to this, in a third embodiment of the present technology, a region where a black crush occurs is detected as a region where the infrared light image signal is to be mixed with the visible light image signal. By this means, it is possible to improve image quality in a black crushed region.

[Configuration of Processing Condition Generating Unit]

Figure 10:
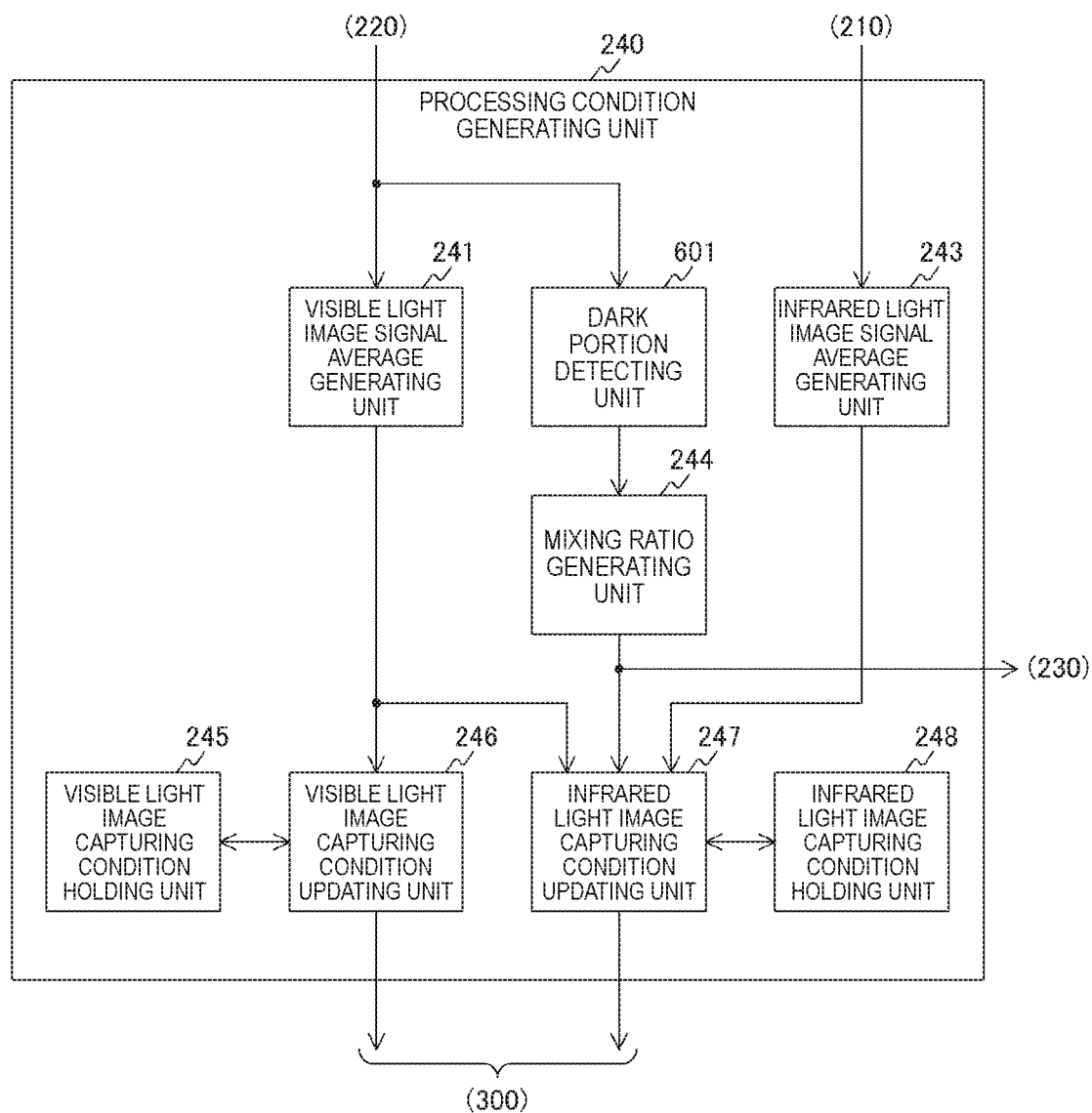
FIG. 10 is a diagram illustrating a configuration example of a processing condition generating unit 240 in a third embodiment of the present technology.

FIG. 10 is a diagram illustrating a configuration example of the processing condition generating unit 240 in the third embodiment of the present technology. The processing condition generating unit 240 in FIG. 10 is different from the processing condition generating unit 240 described in FIG. 3 in that a dark portion detecting unit 601 is provided in place of the fog transmittance generating unit 242.

The dark portion detecting unit 601 detects a dark portion on the basis of the visible light image signal. Here, the dark portion is a region where a so-called black crush occurs. A dark portion occurs when an image with a high dynamic range is captured such as in the case where imaging is performed in a backlit state. In detection of a dark portion, it is, for example, possible to employ a scheme in which a region where a visible light image signal is less than a predetermined threshold is detected. The dark portion detecting unit 601 outputs a region corresponding to a dark portion to the mixing ratio generating unit 244. Note that the dark portion detecting unit 601 is an example of a mixing region detecting unit recited in the claims.

The mixing ratio generating unit 244 in FIG. 10 generates a mixing ratio of the dark portion detected by the dark portion detecting unit 601. For example, it is possible to generate a predetermined mixing ratio for the dark portion. Further, it is possible to set a value "0" as the mixing ratio for other regions. As a result of mixing of the infrared light image signal being performed on the basis of this mixing ratio, it is possible to improve visibility.

The infrared light image capturing condition updating unit 247 in FIG. 10 generates infrared light image capturing conditions which make brightness of the infrared light image signal in the region detected by the dark portion detecting unit 601 substantially equal to brightness of the visible light image signal in regions other than the region detected by the dark portion detecting unit 601. That is, infrared light image capturing conditions which make brightness of the infrared light image signal in the dark portion substantially equal to brightness of the visible light image signal in a region other than the dark portion are generated.

Therefore, in step S922 described in FIG. 6, an average for an average of the visible light image signals for each region is calculated, and the average is made the infrared light photometric target. The infrared light image capturing conditions are generated on the basis of this infrared light photometric target and applied to imaging for the next frame. By this means, it is possible to make brightness of the infrared light image signal in the dark portion substantially equal to brightness of the visible light image signal in a region other than the dark portion. Because processing procedure of the infrared light image capturing condition updating processing other than this is similar to the processing procedure described in FIG. 6, description will be omitted.

Because other components of the imaging apparatus 10 are similar to the components of the imaging apparatus 10 described in the first embodiment of the present technology, description will be omitted.

In this manner, in the third embodiment of the present technology, an image in which an infrared light image signal is mixed with a visible light image signal in the detected dark portion is generated. In this event, image capturing conditions of the infrared light image signal which make brightness of the infrared light image signal in the dark portion substantially equal to brightness of the visible light image signal in a region other than the dark portion are newly generated, and image capturing conditions are updated. The next imaging is performed on the basis of the updated image capturing conditions. Therefore, it is possible to improve image quality in an image with a high dynamic range.

4. Fourth Embodiment

In the above-described third embodiment, a black crushed region is detected. In contrast to this, in a fourth embodiment of the present technology, a region where a halation occurs is detected. By this means, it is possible to improve image quality in a halation region.

[Configuration of Processing Condition Generating Unit]

Figure 11:
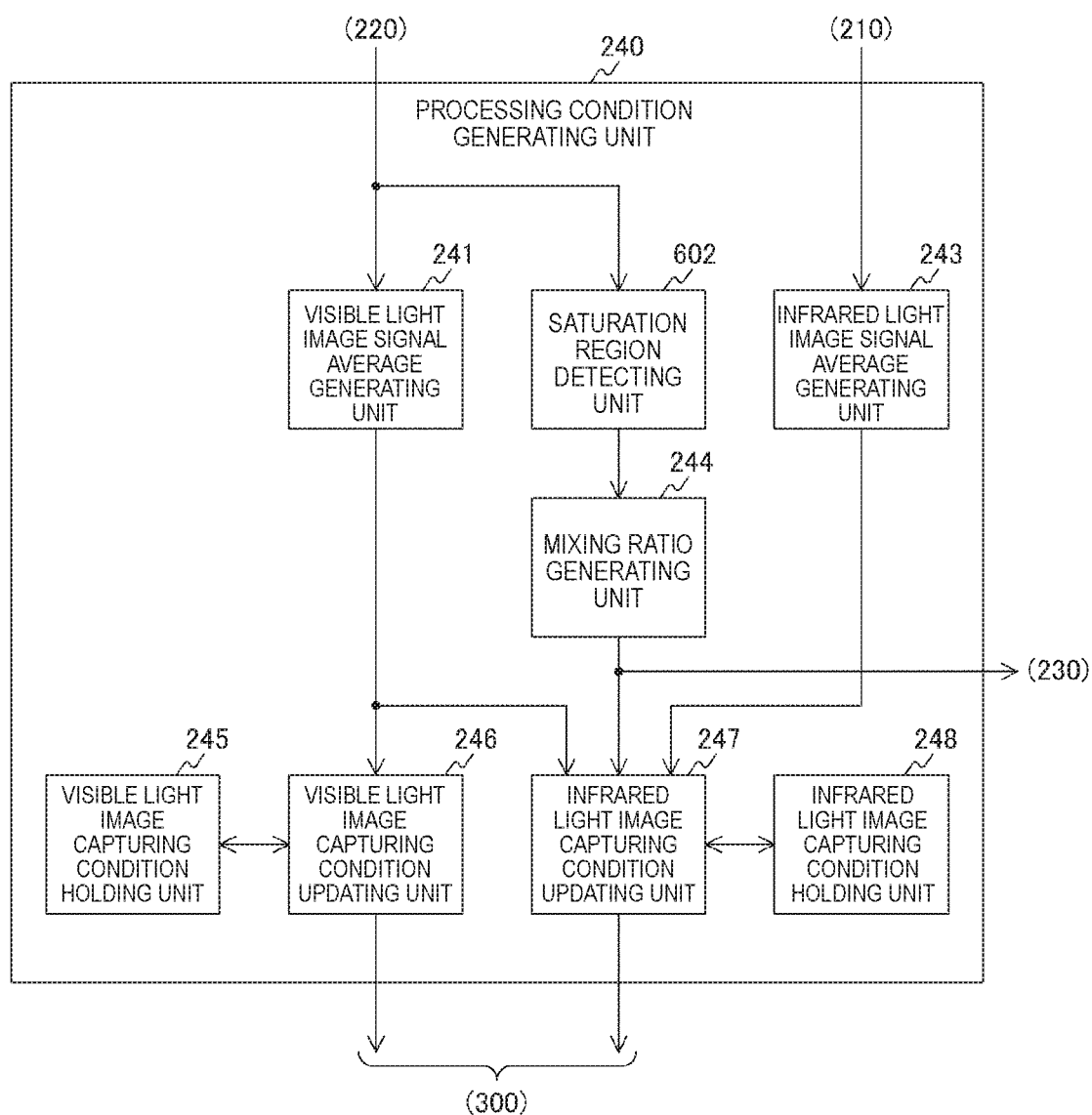
FIG. 11 is a diagram illustrating a configuration example of a processing condition generating unit 240 in a fourth embodiment of the present technology.

FIG. 11 is a diagram illustrating a configuration example of the processing condition generating unit 240 in a fourth embodiment of the present technology. The processing condition generating unit 240 in FIG. 11 is different from the processing condition generating unit 240 described in FIG. 10 in that a saturation region detecting unit 602 is provided in place of the dark portion detecting unit 601.

The saturation region detecting unit 602 detects a saturation region on the basis of the visible light image signal. Here, the saturation region is a region where a so-called halation occurs. In a similar manner to a black crush, in the case where an image with a high dynamic range is captured, for example, in the case where an image including outdoor is captured from indoor, this saturation region occurs. In detection of the saturation region, it is, for example, possible to employ a scheme in which a region where the visible light image signal is greater than a predetermined threshold is detected. The saturation region detecting unit 602 outputs a region corresponding to the saturation region to the mixing ratio generating unit 244. Note that the saturation region detecting unit 602 is an example of a mixing region detecting unit recited in the claims.

The mixing ratio generating unit 244 in FIG. 11 generates a mixing ratio of the saturation region detected by the saturation region detecting unit 602. For example, it is possible to generate a predetermined mixing ratio for the saturation region. Further, it is possible to set a value "0" as the mixing ratio for other regions. As a result of mixing of the infrared light image signal being performed on the basis of this mixing ratio, it is possible to improve visibility.

The infrared light image capturing condition updating unit 247 in FIG. 11 generates infrared light image capturing conditions which make brightness of the infrared light image signal in the region detected by the saturation region detecting unit 602 substantially equal to brightness of the visible light image signal in a region other than the region detected by the saturation region detecting unit 602. That is, infrared light image capturing conditions which make brightness of the infrared light image signal in the saturation region substantially equal to brightness of the visible light image signal in a region other than the saturation region are generated. By this means, it is possible to make brightness of the infrared light image signal in the saturation region substantially equal to brightness of the visible light image signal in a region other than the saturation region. Note that, because processing procedure of infrared light image capturing condition updating processing is similar to processing procedure described in the third embodiment of the present technology, description will be omitted.

Because other components of the imaging apparatus 10 are similar to the components of the imaging apparatus 10 described in the third embodiment of the present technology, description will be omitted.

In this manner, in the fourth embodiment of the present technology, an image in which an infrared light image signal is mixed with a visible light image signal in the detected saturation region is generated. In this event, image capturing conditions of the infrared light image signal which make brightness of the infrared light image signal in the saturation region substantially equal to brightness of the visible light image signal in a region other than the saturation region are newly generated, and the image capturing conditions are updated. The next imaging is performed on the basis of the updated image capturing conditions. Therefore, it is possible to improve image quality in an image with a high dynamic range.

5. Fifth Embodiment

In the above-described first embodiment, a visible light image signal and an infrared light image signal are generated using one image sensor. In contrast to this, in a fifth embodiment of the present technology, imaging is performed using two image sensors of an image sensor which generates a visible light image signal and an image sensor which generates an infrared light image signal. By this means, it is possible to shorten time required for imaging.

[Configuration of Imaging Apparatus]

Figure 12:
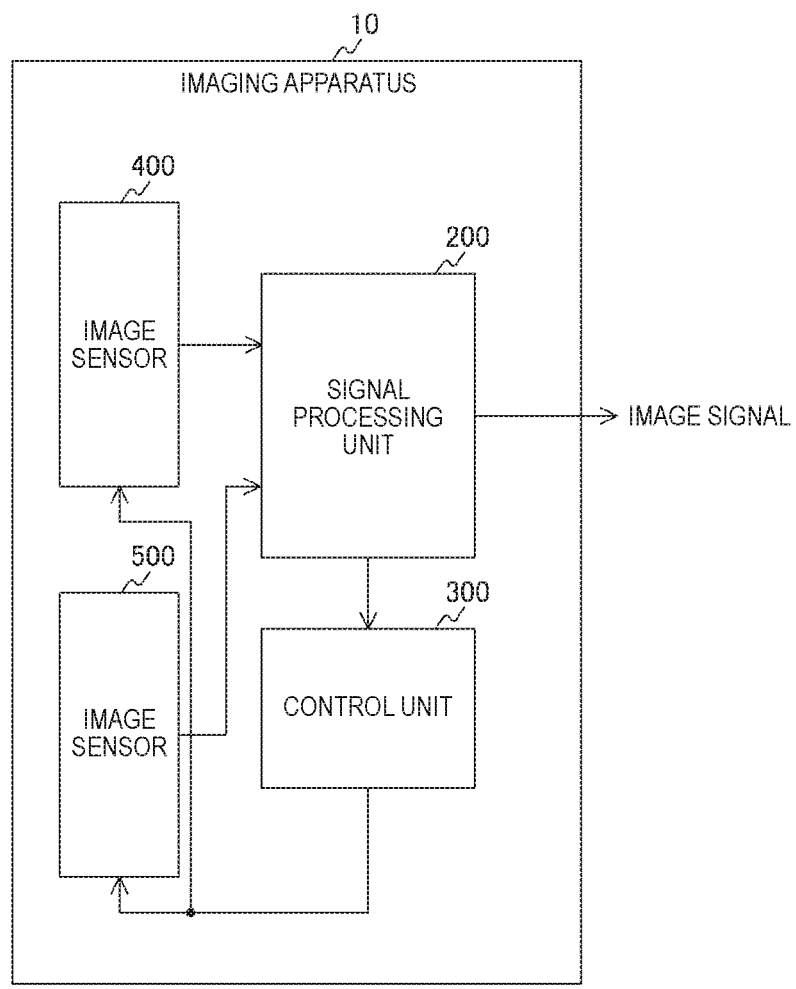
FIG. 12 is a diagram illustrating a configuration example of an imaging apparatus 10 in a fifth embodiment of the present technology.

FIG. 12 is a diagram illustrating a configuration example of the imaging apparatus 10 in the fifth embodiment of the present technology. The imaging apparatus 10 in FIG. 12 is different from the imaging apparatus 10 described in FIG. 1 in that image sensors 400 and 500 are provided in place of the image sensor 100.

The image sensors 400 and 500 respectively generate a visible light image signal and an infrared light image signal at the same time and output the visible light image signal and the infrared light image signal to the signal to the signal processing unit 200.

[Configuration of Signal Processing Unit]

Figure 13:
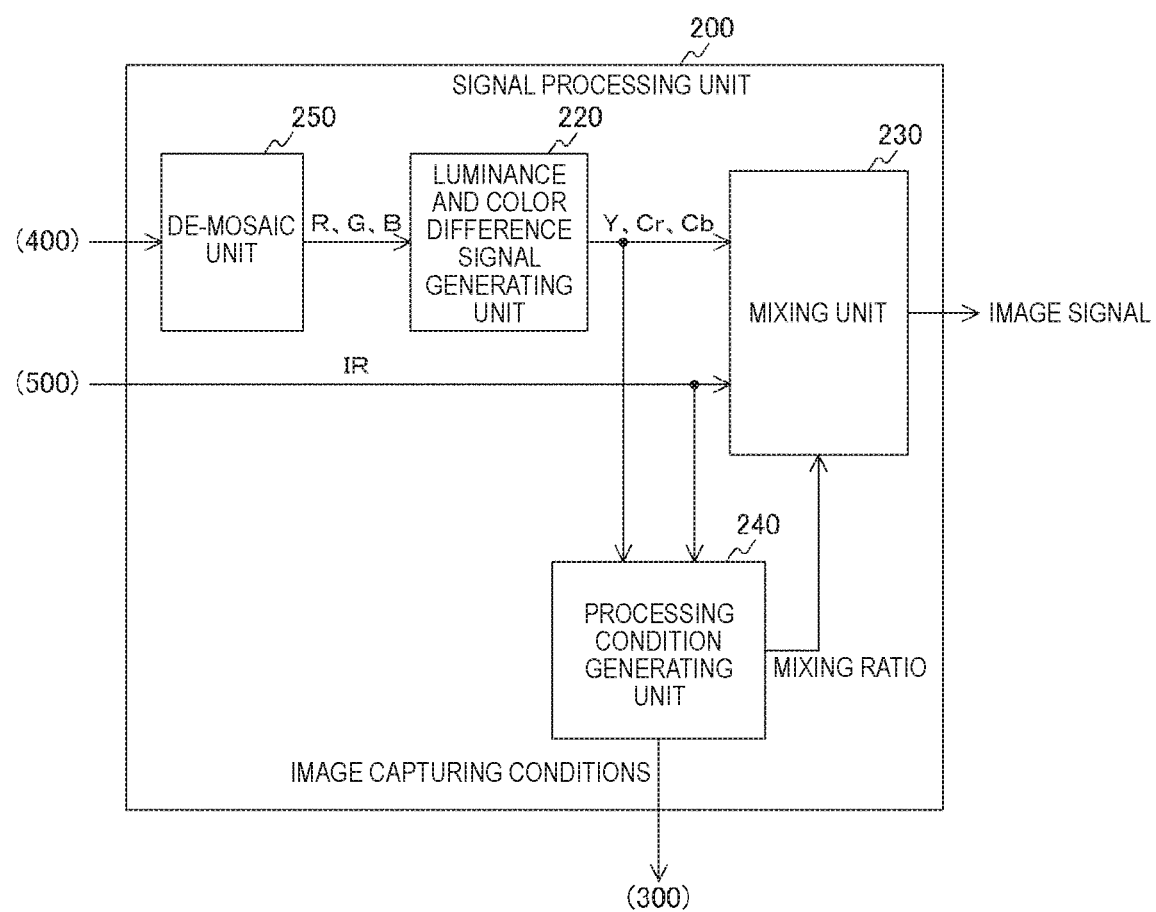
FIG. 13 is a diagram illustrating a configuration example of a signal processing unit 200 in the fifth embodiment of the present technology.

FIG. 13 is a diagram illustrating a configuration example of the signal processing unit 200 in the fifth embodiment of the present technology. The signal processing unit 200 in FIG. 13 does not have to include the separating unit 210 compared to the signal processing unit 200 described in FIG. 2. Further, the de-mosaic unit in FIG. 13 performs de-mosaic processing on the visible light image signal output from the image sensor 400. Then, the de-mosaic unit outputs the visible light image signal subjected to de-mosaic processing to the luminance and color difference signal generating unit 220. Further, the infrared light image signal generated by the image sensor 500 is output to the mixing unit 230. Still further, the control unit 300 controls the image sensors 400 and 500 to cause a visible light image signal and an infrared light image signal to be generated at the same time.

Because other components of the imaging apparatus 10 are similar to the components of the imaging apparatus 10 described in the first embodiment, description will be omitted.

In this manner, according to the fifth embodiment of the present technology, because a visible light image signal and an infrared light image signal are generated at the same time by two image sensors, it is possible to shorten time required for imaging.

6. Sixth Embodiment

In the above-described first embodiment, the image sensor adjusts a level of the image signal. In contrast to this, in a sixth embodiment of the present technology, a signal processing apparatus adjusts a level of the image signal. By this means, it is possible to simplify a configuration of the image sensor.

[Configuration of Signal Processing Unit]

Figure 14:
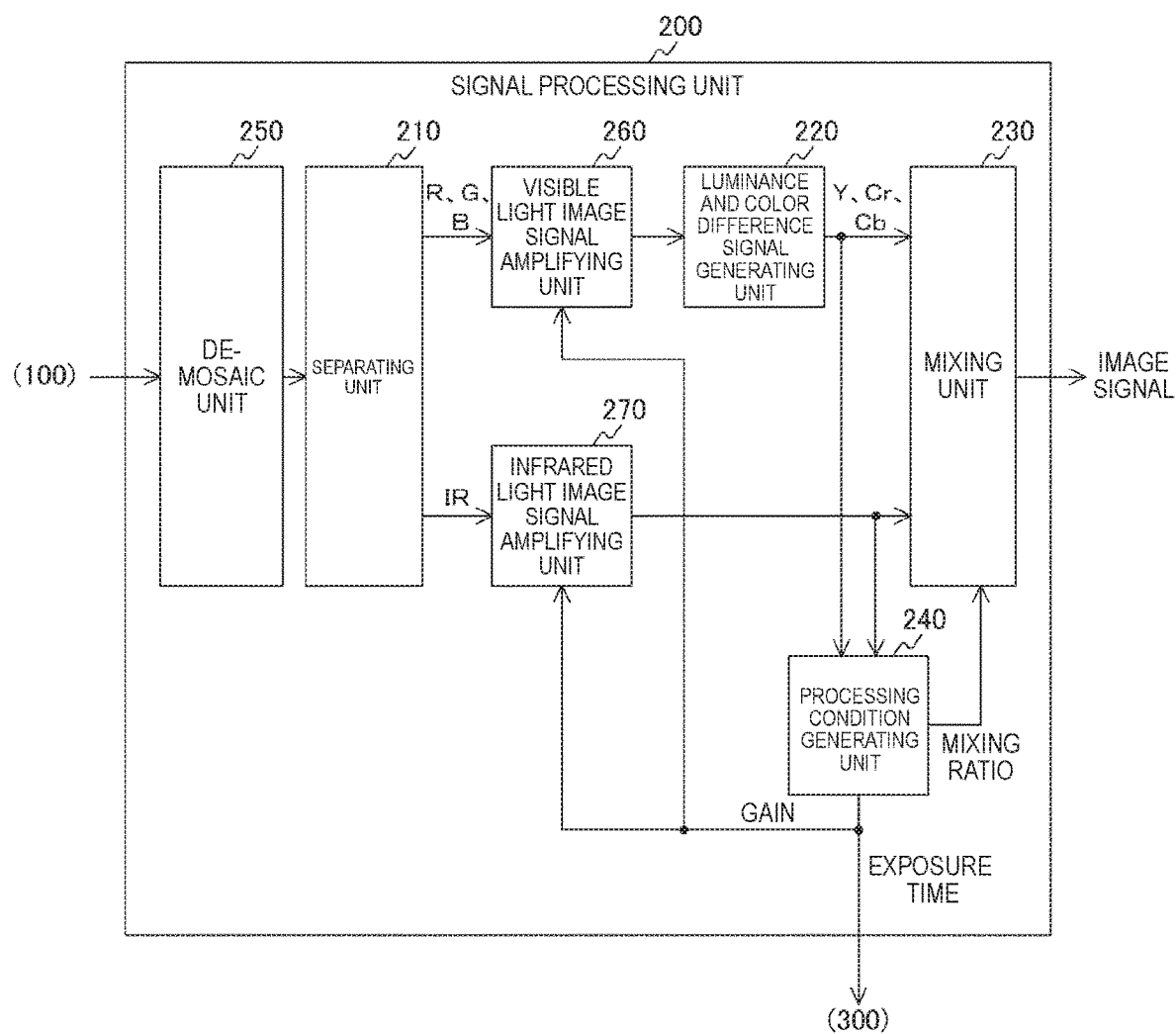
FIG. 14 is a diagram illustrating a configuration example of a signal processing unit 200 in the sixth embodiment of the present technology.

FIG. 14 is a diagram illustrating a configuration example of the signal processing unit 200 in the sixth embodiment of the present technology. The signal processing unit 200 in FIG. 14 is different from the signal processing unit 200 described in FIG. 2 in that a visible light image signal amplifying unit 260 and an infrared light image signal amplifying unit 270 are further provided.

The visible light image signal amplifying unit 260 adjusts a level of the visible light image signal output from the separating unit 210. The visible light image signal amplifying unit 260 adjusts the level of the visible light image signal on the basis of gain among the image capturing conditions output from the processing condition generating unit 240.

The infrared light image signal amplifying unit 270 adjusts a level of the infrared light image signal output from the separating unit 210. The infrared light image signal amplifying unit 270 adjusts the level of the infrared light image signal on the basis of gain among the image capturing conditions output from the processing condition generating unit 240. Note that the infrared light image signal amplifying unit 270 is an example of an amplifying unit recited in the claims.

The processing condition generating unit 240 in FIG. 14 outputs gain among the generated image capturing conditions to the visible light image signal amplifying unit 260 and the infrared light image signal amplifying unit 270 and outputs exposure time to the control unit 300. Note that only the exposure time is input to the image sensor 100 as the image capturing conditions. Because it is not necessary to adjust a level of the image signal, it is possible to simplify a configuration of the image sensor 100.

Because other components of the imaging apparatus 10 are similar to the components of the imaging apparatus 10 described in the first embodiment of the present technology, description will be omitted.

In this manner, according to the sixth embodiment of the present technology, because imaging at the image sensor is controlled on the basis of only exposure time, it is possible to simplify a configuration of the image sensor 100.

Modified Example

While, in the above-described embodiments, a visible light image signal is mixed with an infrared light image signal, a non-visible light image signal other than an infrared light image signal may be mixed. For example, it is possible to mix an image signal by ultraviolet light as the non-visible light image signal.

In this manner, according to the embodiments of the present technology, it is possible to improve image quality of an image including fog or an image with a wide dynamic range by mixing a visible light image signal with a non-visible light image signal to generate an image and optimizing image capturing conditions of the non-visible light image signal.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)

A signal processing apparatus including:
a mixing region detecting unit configured to detect a region where a non-visible light image signal is to be mixed with a visible light image signal, the non-visible light image signal and the visible light image signal being generated by repeatedly performing imaging on a basis of a predetermined image capturing condition; and
an image capturing condition updating unit configured to newly generate an image capturing condition in the non-visible light image signal on a basis of the non-visible light image signal in the detected region to update the predetermined image capturing condition.

(2)

The signal processing apparatus according to (1),
in which the image capturing condition updating unit newly generates an image capturing condition in which the non-visible light image signal becomes substantially equal to the visible light image signal in the detected region to update the predetermined image capturing condition.

(3)

The signal processing apparatus according to (1),
in which the image capturing condition updating unit newly generates an image capturing condition in which the non-visible light image signal in the detected region becomes substantially equal to the visible light image signal in a region other than the detected region to update the predetermined image capturing condition.

(4)

The signal processing apparatus according to (1) or (2),
in which the mixing region detecting unit detects the region on a basis of transmittance of fog imaged in the visible light image signal.

(5)

The signal processing apparatus according to (4),
in which the mixing region detecting unit detects, as the region, a region where the transmittance of the fog is less than a predetermined threshold.

(6)

The signal processing apparatus according to (1) or (2),
in which the mixing region detecting unit detects, as the region, a region of a face included in the visible light image signal.

(7)

The signal processing apparatus according to (1) or (3),
in which the mixing region detecting unit detects, as the region, a region where the visible light image signal is greater than a predetermined threshold.

(8)

The signal processing apparatus according to (1) or (3),
in which the mixing region detecting unit detects, as the region, a region where the visible light image signal is less than a predetermined threshold.

(9)

The signal processing apparatus according to any of (1) to (8), further including:
a mixing ratio generating unit configured to generate a mixing ratio in the mixing on a basis of the non-visible light image signal in the detected region,
in which the image capturing condition updating unit newly generates an image capturing condition in the non-visible light image signal on a basis of the generated mixing ratio to update the predetermined image capturing condition.

(10)

The signal processing apparatus according to any of (1) to (9), further including:
an amplifying unit configured to adjust a level of the non-visible light image signal on a basis of the image capturing condition.

(11)

The signal processing apparatus according to any of (1) to (10),
in which the non-visible light image signal is an infrared light image signal corresponding to infrared light.

(12)

An imaging apparatus including:
an image sensor configured to generate a non-visible light image signal and a visible light image signal by repeatedly performing imaging on a basis of a predetermined image capturing condition;
a mixing region detecting unit configured to detect a region where the non-visible light image signal is to be mixed with the visible light image signal; and
an image capturing condition updating unit configured to newly generate an image capturing condition in the non-visible light image signal on a basis of the non-visible light image signal in the detected region to update the predetermined image capturing condition.

(13) A signal processing method including:
mixing region detection procedure of detecting a region where a non-visible light image signal is to be mixed with a visible light image signal, the non-visible light image signal and the visible light image signal being generated by repeatedly performing imaging on a basis of a predetermined image capturing condition; and
image capturing condition updating procedure of newly generating an image capturing condition in the non-visible light image signal on a basis of the non-visible light image signal in the detected region to update the predetermined image capturing condition.

REFERENCE SIGNS LIST 10 imaging apparatus
100, 400, 500 image sensor
200 signal processing unit
210 separating unit
220 luminance and color difference signal generating unit
230 mixing unit
240 processing condition generating unit
241 visible light image signal average generating unit
242 fog transmittance generating unit
243 infrared light image signal average generating unit
244 mixing ratio generating unit
245 visible light image capturing condition holding unit
246 visible light image capturing condition updating unit
247 infrared light image capturing condition updating unit
248 infrared light image capturing condition holding unit
249 face region detecting unit
250 de-mosaic unit
260 visible light image signal amplifying unit
270 infrared light image signal amplifying unit
300 control unit
601 dark portion detecting unit
602 saturation region detecting unit

The invention claimed is:

1. A signal processing apparatus, comprising:
a mixing region detecting unit configured to detect a first region associated with an image, wherein
the first region is a region where a non-visible light image signal associated with the image is to be mixed with a visible light image signal associated with the image,
the non-visible light image signal and the visible light image signal are generated based on an imaging operation, and
the imaging operation is based on a first image capturing condition;
a mixing ratio generating unit configured to generate a mixing ratio based on a transmittance of fog in the visible light image signal; and
an image capturing condition updating unit configured to:
generate a second image capturing condition associated with the non-visible light image signal, wherein the second image capturing condition is generated based the mixing ratio; and
update the first image capturing condition based on the generated second image capturing condition.

2. The signal processing apparatus according to claim 1, wherein
the image capturing condition updating unit is further configured to:
generate a third image capturing condition, wherein
in the third image capturing condition, a brightness associated with the non-visible light image signal in the detected first region is substantially equal to a brightness associated with the visible light image signal in the detected first region; and
update the first image capturing condition based on the generated third image capturing condition.

3. The signal processing apparatus according to claim 1, wherein
the image capturing condition updating unit is further configured to:
generate a fourth image capturing condition, wherein
in the fourth image capturing condition, a brightness associated with the non-visible light image signal in the detected first region is substantially equal to a brightness associated with the visible light image signal in a second region of the image,
the second region is different from the detected first region; and
update the first image capturing condition based on the generated fourth image capturing condition.

4. The signal processing apparatus according to claim 1, wherein the mixing region detecting unit is further configured to detect the first region based on the transmittance of fog in the visible light image signal.

5. The signal processing apparatus according to claim 4, wherein the mixing region detecting unit is further configured to detect the first region based on a value of the transmittance of fog that is less than a threshold value.

6. The signal processing apparatus according to claim 1, wherein the mixing region detecting unit is further configured to detect, as the first region, a region of a face in the visible light image signal.

7. The signal processing apparatus according to claim 1, wherein the mixing region detecting unit is further configured to detect, as the first region, a region where the visible light image signal is greater than a threshold value.

8. The signal processing apparatus according to claim 1, wherein the mixing region detecting unit is further configured to detect, as the first region, a region where the visible light image signal is less than a threshold value.

9. The signal processing apparatus according to claim 1, further comprising:
the mixing ratio generating unit is further configured to generate the mixing ratio based on the non-visible light image signal in the detected first region, wherein
the image capturing condition updating unit is further configured to:
generate a fifth image capturing condition associated with the non-visible light image signal,
the fifth image capturing condition is generated based on the generated mixing ratio, and
update the first image capturing condition based on the fifth image capturing condition.

10. The signal processing apparatus according to claim 1, further comprising:
an amplifying unit configured to adjust a level of the non-visible light image signal based on the first image capturing condition.

11. The signal processing apparatus according to claim 1, wherein the non-visible light image signal is an infrared light image signal corresponding to infrared light.

12. An imaging apparatus, comprising:
an image sensor configured to generate a non-visible light image signal and a visible light image signal based on an imaging operation, wherein the imaging operation is based on a first image capturing condition;
a mixing region detecting unit configured to detect a region associated with an image, wherein
the non-visible light image signal and the visible light image signal are associated with the image, and
the detected region is a region where the non-visible light image signal is to be mixed with the visible light image signal;
a mixing ratio generating unit configured to generate a mixing ratio based on a transmittance of fog in the visible light image signal; and
an image capturing condition updating unit configured to:
generate a second image capturing condition associated with the non-visible light image signal, wherein the second image capturing condition is generated based on the mixing ratio; and
update the first image capturing condition based on the generated second image capturing condition.

13. A signal processing method, comprising:
detecting a region associated with an image, wherein
the detected region is a region where a non-visible light image signal associated with the image is to be mixed with a visible light image signal associated with the image,
the non-visible light image signal and the visible light image signal are generated based on an imaging operation, and
the imaging operation is based a first image capturing condition;
generating a mixing ratio based on a transmittance of fog in the visible light image signal;
generating a second image capturing condition associated with the non-visible light image signal,
wherein the second image capturing condition is generated based on a basis of the mixing ratio; and
updating update the first image capturing condition based on the generated second image capturing condition.

* * * * *